Patented Feb. 17, 1953

2,628,930

UNITED STATES PATENT OFFICE 2,628,930

AQUEOUS EMULSIONS OF LIPOID-SOLUBLE VITAMINS

Margaret Rose Zentner, West Orange, N. J., assignor to Hoffmann-La Roche Inc., Nutley, N. J., a corporation of New Jersey No Drawing. Application May 17, 1951,
Serial No. 226,956

7 Claims. (Cl. 167—81)

This invention relates to aqueous emulsions of lipoid-soluble vitamin-active materials. More particularly, it relates to aqueous emulsions of lipoid-soluble materials having vitamin A, D, or E activity, wherein gelatin, ascorbyl palmitate and a higher fatty acid monoester of glycerol or of propylene glycol are present as jointly acting emulsifiers, i. e. co-emulsifiers, for the lipoid-soluble material.

The emulsions of the invention exhibit a high degree of chemical and physical stability, even under extreme conditions of temperature variation and even when stored for extended periods. The non-vitamin components are unobjectionable physiologically. The emulsions can be subjected to heat-sterilization without excessive deterioration, and hence can be prepared for parenteral administration as well as peroral administration. Heat sterilization can be effected by any method not adversely affecting the chemical or physical stability of the emulsion, the following being illustrative methods: (1) The emulsion is filled into ampuls under carbon dioxide atmosphere, the ampuls are sealed, and the sealed ampuls are autoclaved for 20 to 30 minutes under 15 lb. gauge pressure of steam; cf. U. S. Pharmacopoeia XIII, page 694. (2) The ampuls, after filling and sealing as above, are subjected to free-flowing steam for 30-minute periods on each of three successive days; cf. U. S. Pharmacopoeia XIII, page 695.

In preparing the emulsions of the invention, particularly in the case of emulsions intended for injection, it is preferred to use a good pharmaceutical grade gelatin made by the lime process from the dephosphated hard bone of food animals. A convenient procedure is to start with a gelatin solution of from about 4 to about 10 per cent strength and having a viscosity of from about 2.8 to about 13.5 centistokes (measured at 37.5° C. and pH 8.5 in an Ostwald-Cannon-Fenske viscosimeter), and to adjust the viscosity thereof by heat-degradation either before or after compounding the emulsion. In the case of emulsions intended for parenteral administration, such degradation is advantageously combined with the heat-sterilization step. A gelatin solution of about 5 per cent strength, having an initial viscosity (before degradation) in the range of about 4.3 to about 8.6 centistokes (measured under the above stated conditions), and subsequently autoclaved under 15 pounds gauge pressure of steam for about 20 to 30 minutes is preferred as the gelatin component of the emulsion. It will be understood that the invention is not limited to the above embodiments. Acceptable emulsions have been prepared using gelatin solutions having an initial pH in the range of about 4.3 to about 10.4. Similarly, when the sterility or the viscosity of the finished emulsion are not of prime importance, it has been found that heat degradation of the finished emulsion or, respectively, of the gelatin component thereof, can be dispensed with.

Among the higher fatty acid monoesters, those having 12 to 18 carbon atoms in the acid radical are preferred. Glyceryl monostearate, propylene glycol monooleate, propylene glycol monolaurate, and a mixture of the monoglycerides of the mixed higher fatty acids of cottonseed oil have given satisfactory results. Glyceryl monostearate is particularly preferred.

Additional components can be incorporated in the emulsions as desired, e. g. sodium sulfite as an antioxidant; antiseptics and sterilizing agents such as "Nipagin" (methyl p-hydroxybenzoate), "Nipasol" (propyl p-hydroxybenzoate), chlorobutanol and phenol; buffering materials, such as citric acid, disodium phosphate, and sodium hydroxide; solvents such as glycerol; stabilizers, such as sesame oil, corn oil, olive oil, peanut oil, cottonseed oil, hydrogenated fat (e. g. "Crisco") and mineral oil; anesthetics, such as benzyl alcohol; flavors, such as vanillin; and sweetening agents, such as saccharin.

Satisfactory emulsions have been prepared having a final pH in the range of about 5.9 to about 8, but it is preferred to adjust the pH to a value within the range of about 6.8 to about 7.5.

The following examples are illustrative of, but not limitative of, the invention.

*Example 1*

55 g. of α-tocopherol, 10 g. of glyceryl monostearate, and 5 g. of 1-ascorbyl palmitate were warmed on a water bath to about 80–85° C. under a carbon dioxide atmosphere until a clear molten mass was obtained. Then the heating was discontinued and 750 cc. of warm 4 per cent gelatin solution, pH about 8.5, (containing 30 g. of gelatin) and also containing 1.35 g. of "Nipagin," 0.15 g. of "Nipasol" and 0.375 g. of NaOH, were added in small portions while stirring. When about a quarter to a third of the gelatin solution had been added, a homogeneous, buff-colored, viscous emulsion was formed; upon further addition of gelatin solution, the emulsion thinned out. After all the gelatin had been added, 50 cc. of warm U. S. P. glycerol containing 0.45 g. of "Nipagin" and 0.05 g. of "Nipasol" were added while stirring. The 20 cc. of warm water containing 0.677 g. of citric acid monohydrate and 4.675 g. of anhydrous disodium phosphate were added to the emulsion. Thereupon, 10 cc. of warm water containing anhydrous sodium sulfite were stirred into the emulsion. Finally, sufficient water was added to adjust the volume to approximately 1 liter and the pH was adjusted to about 7.0 with NaOH. 1 cc. of this emulsion contained about 55 mg. of $\alpha$-tocopherol.

The emulsion thus obtained was mechanically homogenized for about 20 minutes at 3000 lbs. pressure in a recirculating homogenizer equipped with a cooling bath. The homogenized emulsion was then filtered through a coarse glass-fritted filter, filled into ampuls, and then gassed with carbon dioxide. A number of these ampuls were sterilized by being autoclaved for 30 minutes under 15 lbs. gauge pressure of steam. These were stored for four months at 37° C., for five months at room temperature, and for five months in the refrigerator. No change in the appearance or stability of the emulsion was noted. The vitamin content was determined after storage for six weeks at 45° C. and found to be unchanged.

The remainder of the ampuls described above were sterilized by being heated in free flowing steam for 30 minutes on each of the three successive days. The emulsion was stored for five months at 37° C., for six months at room temperature, and for six months under refrigeration. No changes in the appearance of the emulsion were noted.

*Example 2*

In a manner similar to that described in Example 1, an emulsion was prepared containing the following ingredients in each 100 cc.:

10.18 g. alpha-tocopherol.
1.38 g. glyceryl monostearate.
0.69 g. l-ascorbyl palmitate.
3.7 g. gelatin (=82.2 cc. of 4.5% gelatin solution, pH 8.5).
4.63 cc. glycerol U. S. P.
0.166 g. "Nipagin."
0.0185 g. "Nipasol."
0.0627 g. citric acid.
0.4328 g. $Na_2HPO_4$ anhydrous.
0.325 g. $Na_2SO_3$ anhydrous.
Distilled water q. s. 100 cc.

The pH of the emulsion was found to be 6.72. It was adjusted with dilute NaOH to pH 6.95.

The procedure was like that of Example 1, the finished emulsion being sterilized by autoclaving for 30 minutes under 15 lbs. gauge pressure of steam.

*Example 3*

In a manner similar to that described in Example 1, an emulsion was prepared containing the following ingredients per 100 cc.:

11.0 g. alpha-tocopherol acetate.
1.0 g. glyceryl monostearate.
0.5 g. l-ascorbyl palmitate.
1.0 g. gelatin (=20.0 cc. of 5% gelatin solution).
30.0 cc. glycerol U. S. P.
0.18 g. "Nipagin."
0.02 g. "Nipasol."
0.0677 g. citric acid (1 mol water).
0.4675 g. $Na_2HPO_4$ anhydrous.
Flavors and saccharin.
Distilled water q. s. 100 cc.

The pH of the emulsion was found to be 6.65. It was adjusted with dilute NaOH to pH 7.0.

In this example, the gelatin solution was prepared by autoclaving 20 cc. of 5 per cent gelatin solution, pH 8.5, for 20 minutes at 15 lbs. gauge steam pressure, and the final emulsion was not heat sterilized; otherwise the procedure was the same as that described in Example 1.

*Example 4*

An emulsion was prepared containing the following ingredients per 100 cc.:

11.0 g. alpha-tocopherol acetate.
1.5 g. glycerol monostearate.
0.75 g. l-ascorbyl palmitate.
4.5 g. gelatin (=45 cc. of 10% gelatin solution).
10.0 cc. glycerol U. S. P.
0.18 g. "Nipagin."
0.02 g. "Nipasol."
0.04 g. citric acid (1 mol water).
0.4675 g. $Na_2HPO_4$ anhydrous.
Flavors and saccharin.
Distilled water q. s. 100 cc.

The pH of the emulsion was found to be 6.8. It was adjusted with dilute NaOH to pH 6.85.

The procedure used was the same as that of Example 3 except that the gelatin solution used was that obtained by autoclaving 45 cc. of 10 per cent gelatin solution, pH 8.5, for 60 minutes at 15 lbs. gauge steam pressure.

*Example 5*

An emulsion was prepared containing the following ingredients:

11.0 g. $\alpha$-tocopherol acetate.
1.5 g. glyceryl monostearate.
0.75 g. l-ascorbyl palmitate.
2.0 g. gelatin (=40 cc. of 5% gelatin solution).
20.0 cc. glycerol U. S. P.
0.18 g. "Nipagin."
0.02 g. "Nipasol."
0.48 g. $Na_2HPO_4$ anhydrous.
0.04 g. citric acid (1 mol water).
0.01 g. saccharin.
0.025 g. vanillin.
Distilled water q. s. 100 cc.

The pH of the emulsion was found to be 6.82. It was adjusted with dilute NaOH to pH 7.27.

The procedure used was the same as that of Example 3, except that the gelatin solution used was that obtained by autoclaving 40 cc. of 5 per cent gelatin solution, pH 10.4, for 60 minutes at 15 lbs. gauge pressure.

*Example 6*

An emulsion was prepared containing the following ingredients per 100 cc.:

5.5 g. alpha-tocopherol.
1.0 g. glyceryl monostearate.
0.25 g. l-ascorbyl palmitate.
0.75 g. gelatin (=15 cc. of 5% gelatin solution, pH 8.5).
0.171 g. "Nipagin."
0.019 g. "Nipasol."
Distilled water q. s. 100 cc.

The pH was 6.08.

The procedure used was like that of Example 3 except that the gelatin was not subjected to heat degradation.

*Example 7*

An emulsion was prepared containing the following ingredients per 100 cc.:

5.5 g. alpha-tocopherol.
2.0 g. glyceryl monostearate.

0.5 g. 1-ascorbyl palmitate.
3.0 g. gelatin (=60 cc. of 5% gelatin solution, pH 8.5).
0.171 g. "Nipagin."
0.019 g. "Nipasol."
Distilled water q. s. 100 cc.

The pH of the emulsion was 6.12.

The procedure used was like that of Example 3 except that the gelatin was not subjected to heat degradation.

*Example 8*

An emulsion was prepared containing the following ingredients per 100 cc.:

5.5 g. alpha-tocopherol.
0.125 g. glyceryl monostearate.
0.125 g. 1-ascorbyl palmitate.
3.0 g. gelatin (=60 cc. of 5% gelatin solution, pH 8.5).
0.171 g. "Nipagin."
0.019 g. "Nipasol."
Distilled water q. s. 100 cc.

The pH of the emulsion was 7.7.

The procedure used was like that of Example 3 except that the gelatin was not subjected to heat degradation.

*Example 9*

An emulsion was prepared containing the following ingredients per 100 cc.:

5.5 g. alpha-tocopherol.
0.250 g. propylene glycol monooleate.
0.50 g. 1-ascorbyl palmitate.
3.0 g. gelatin (=60 cc. of 5% gelatin solution, pH 8.5).
0.108 g. "Nipagin."
0.12 g. "Nipasol."
Distilled water q. s. 100 cc.

The pH of the emulsion was 6.3.

The procedure used was like that of Example 3 except that the gelatin was not subjected to heat degradation.

*Example 10*

An emulsion was prepared containing the following ingredients per 100 cc.:

5.5 g. alpha-tocopherol.
1.0 g. mixed monoglycerides of mixed higher fatty acids of cottonseed oil.
0.5 g. 1-ascorbyl palmitate.
0.171 g. "Nipagin."
0.091 g. "Nipasol."
3.0 g. gelatin (=60 cc. of 5% gelatin solution, pH 85).
Distilled water q. s. 100 cc.

The pH of the emulsion was 6.4.

The procedure used was like that of Example 3 except that the gelatin was not subjected to heat degradation.

*Example 11*

An emulsion was prepared containing the following ingredients per 100 cc.:

5.5 g. alpha-tocopherol.
1.0 g. propylene glycol monolaurate.
0.5 g. 1-ascorbyl palmitate.
0.171 g. "Nipagin."
0.091 g. "Nipasol."
3.0 g. gelatin (=60 cc. of 5% gelatin solution, pH 8.5).
Distilled water q. s. 100 cc.

The pH of the emulsion was 6.53.

The procedure used was like that of Example 3 except that the gelatin was not subjected to heat degradation.

*Example 12*

An emulsion was prepared containing the following ingredients per 100 cc.:

6.04 g. alpha-tocopherol acetate.
1.0 g. glyceryl monostearate.
0.5 g. 1-ascorbyl palmitate.
3.0 g. gelatin (=60 cc. of 5% gelatin solution, pH 8.5).
5.0 cc. glycerol U. S. P.
0.18 g. "Nipagin."
0.02 g. "Nipasol."
0.0677 g. citric acid (1 mol water).
0.4675 g. $Na_2HPO_4$ anhydrous.
0.35 g. $Na_2SO_3$ anhydrous.
Distilled water q. s. 100 cc.

The pH of the emulsion was 7.15.

The procedure used was the same as that of Example 1, using the autoclaving method of heat sterilization.

*Example 13*

An emulsion was prepared containing the following ingredients per 200 cc.:

10.0 g. irradiated ergosterol, having a potency of 1,000,000 u/gm.
2.0 g. glyceryl monostearate.
1.0 g. 1-ascorbyl palmitate.
6.0 g. gelatin (=120 cc. of 5% gelatin solution, pH 8.5).
10.0 cc. glycerol U. S. P.
0.360 g. "Nipagin."
0.04 g. "Nipasol."
0.135 g. citric acid (1 mol water).
0.935 g. $Na_2HPO_4$ anhydrous.
0.7 g. $Na_2SO_3$ anhydrous.
Distilled water q. s. 200 cc.

The pH of the emulsion was 7.05.

The procedure used was the same as that of Example 1, using the autoclaving method of heat sterilization.

*Example 14*

An emulsion was prepared containing the following ingredients per 100 cc.:

3.5 g. synthetic vitamin A palmitate having a potency of 1,710,000 International Units/g.
0.812 g. glyceryl monostearate.
0.406 g. 1-ascorbyl palmitate.
4.0 g. gelatin (=80 cc. of 5% gelatin solution, pH 8.5).
5.0 cc. glycerol U. S. P.
0.144 g. "Nipagin"
0.016 g. "Nipasol."
0.0677 g. citric acid (1 mol water).
0.4676 g. $Na_2HPO_4$ anhydrous.
0.35 g. $Na_2SO_3$ anhydrous.
Distilled water q. s. 100 cc.

The pH of the emulsion was 7.28.

The procedure used was the same as that of Example 1, using the autoclaving method of heat sterilization.

*Example 15*

An emulsion was prepared containing the following ingredients per 100 cc.:

3.5 g. synthetic vitamin A palmitate having a potency of 1,000,000 International Units/g.
0.812 g. glyceryl monostearate.
0.406 g. 1-ascorbyl palmitate.
3.5 g. sesame oil.

4.0 g. gelatin (=80 cc. of 5% gelatin solution, pH 8.5).
5.0 cc. glycerol U. S. P.
0.144 g. "Nipagin."
0.016 g. "Nipasol."
0.13 g. citric acid (1 mol water).
0.94 g. Na$_2$HPO$_4$ anhydrous.
0.35 g. Na$_2$SO$_3$ anhydrous.
Distilled water q. s. 100 cc.

The pH of the emulsion was 7.12.

The procedure used was the same as that of Example 1, using the autoclaving method of heat sterilization.

I claim:

1. An aqueous emulsion containing a lipoid-soluble vitamin-active material and as co-emulsifiers therefor, gelatin, ascorbyl palmitate, and a higher fatty acid monoester of a member selected from the group consisting of glycerol and propylene glycol.

2. A stable emulsion of a vitamin E active material and water containing as co-emulsifiers gelatin, ascorbyl palmitate, and a higher fatty acid monoester of a member selected from the group consisting of glycerol and propylene glycol.

3. A stable emulsion of a vitamin A active material and water containing as co-emulsifiers gelatin, ascorbyl palmitate, and a higher fatty acid monoester of a member selected from the group consisting of glycerol and propylene glycol.

4. A stable emulsion of a vitamin D active material and water containing as co-emulsifiers gelatin, ascorbyl palmitate, and a higher fatty acid monoester of a member selected from the group consisting of glycerol and propylene glycol.

5. An aqueous emulsion containing vitamin E and, as co-emulsifiers therefor, ascorbyl palmitate, glyceryl monostearate and gelatin.

6. An aqueous emulsion containing vitamin D and, as co-emulsifiers therefor, ascorbyl palmitate, glyceryl monostearate and gelatin.

7. An aqueous emulsion containing vitamin A and, as co-emulsifiers therefor, ascorbyl palmitate, glyceryl monostearate and gelatin.

MARGARET ROSE ZENTNER.

REFERENCES CITED

The following references are of record in the file of this patent:

UNITED STATES PATENTS

| Number | Name | Date |
|---|---|---|
| 2,109,842 | Harris | Mar. 1, 1938 |
| 2,276,531 | Wechsler | Mar. 17, 1942 |

FOREIGN PATENTS

| Number | Country | Date |
|---|---|---|
| 425,998 | Great Britain | Mar. 26, 1935 |

OTHER REFERENCES

Ambrose, Archives of Biochemistry, vol. 12, March 1947, pages 377, 378.